(12) United States Patent  
Miike (10) Patent No.: US 11,584,472 B2  
(45) Date of Patent: Feb. 21, 2023

(54) HANDLE

(71) Applicant: SUZUKI MOTOR CORPORATION, Hamamatsu (JP)

(72) Inventor: Shota Miike, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 24 days.

(21) Appl. No.: 17/236,069

(22) Filed: Apr. 21, 2021

(65) Prior Publication Data

US 2021/0323630 A1 Oct. 21, 2021

(30) Foreign Application Priority Data

Apr. 21, 2020 (JP) .............................. JP2020-075310

(51) Int. Cl.
*B62K 21/12* (2006.01)
*B62K 21/22* (2006.01)
*B62K 21/20* (2006.01)

(52) U.S. Cl.
CPC .............. *B62K 21/12* (2013.01); *B62K 21/20* (2013.01); *B62K 21/22* (2013.01)

(58) Field of Classification Search
CPC ......... B62K 21/12; B62K 21/20; B62K 21/22
See application file for complete search history.

(56) References Cited

U.S. PATENT DOCUMENTS

| | | | | |
|---|---|---|---|---|
| 6,332,625 B1* | 12/2001 | Fukunaga | .............. | B62K 21/20 280/279 |
| 6,712,541 B1* | 3/2004 | Henricksen | ............ | B62K 21/04 403/338 |
| 7,121,568 B2* | 10/2006 | Law | ........................ | B62K 21/18 280/288.4 |
| 7,798,511 B2* | 9/2010 | Takenaka | ............... | B62K 11/14 280/279 |
| 7,896,378 B2* | 3/2011 | Suita | ...................... | B62K 11/14 74/551.2 |

FOREIGN PATENT DOCUMENTS

| | | | | |
|---|---|---|---|---|
| CN | 106240716 A | * | 12/2016 | ............. B62K 11/04 |
| EP | 2979965 A1 | * | 2/2016 | ............. B62K 21/08 |
| JP | H07132871 A | | 5/1995 | |
| JP | 2009067284 A | | 4/2009 | |
| JP | 2012-76484 A | | 4/2021 | |
| WO | WO 2017092916 A1 | * | 6/2017 | ............. B62K 21/12 |

OTHER PUBLICATIONS

Office Action issued in Indian Application No. 202114017775 dated Mar. 31, 2022.

* cited by examiner

*Primary Examiner* — Vinh Luong
(74) *Attorney, Agent, or Firm* — Troutman Pepper Hamilton Sanders LLP (57) ABSTRACT

A handle to be installed on an upper bracket that connects upper end sides of a pair of front forks is provided. The handle includes a handle bar and a handle holder. The handle bar includes a base portion installed on an upper surface of the upper bracket. The handle holder extends from a center of the upper surface of the upper bracket toward the pair of front forks. The base portion and the handle holder are fixed to the upper bracket by a fixing member.

8 Claims, 9 Drawing Sheets

HANDLE

CROSS-REFERENCE TO RELATED APPLICATION

The disclosure of Japanese Patent Application No. 2020-075310 filed on Apr. 21, 2020, including specification, drawings and claims is incorporated herein by reference in its entirety.

BACKGROUND

The present invention relates to a handle.

In a related art, one in which a pair of handle bars are installed on an upper bracket connecting upper end sides of a pair of front forks via a pair of clamp members is known as a handle of a straddle-type vehicle (for example, see JP-A-2012-076484). In the handle described in JP-A-2012-076484, the pair of front forks protrude from an upper surface of the upper bracket, and the pair of clamp members on the upper bracket are attached to protruding portions of the front forks. An insertion hole for the handle is formed in each clamp member, and the handle bar is screwed to the clamp member in a state in which the handle bar is inserted into the insertion hole.

SUMMARY

According to an aspect of the present invention, there is provided a handle installed on an upper bracket connecting upper end sides of a pair of front forks, the handle including: a handle bar including a base portion installed on an upper surface of the upper bracket; and a handle holder extending from a center of the upper surface of the upper bracket toward the pair of front forks, in which the base portion and the handle holder are fixed to the upper bracket by a fixing member.

DETAILED DESCRIPTION

Components such as a master cylinder, a brake lever, a clutch lever, and a handle switch are installed in the vicinity of the handle, and it is difficult to ensure a sufficient space for installing the clamp members. Since the handle bar is screwed to the clamp member described in JP-A-2012-076484, in order to avoid interference between a screw head and the components in the vicinity of the handle, a degree of freedom in designing an installation position, an installation direction, a bar shape and the like of the handle bar with respect to the clamp member is restricted.

The present invention has been made in view of the above circumstances, and an object thereof is to provide a handle capable of improving a degree of freedom in designing a handle bar.

A handle according to an aspect of the present invention is installed on an upper bracket connecting upper end sides of a pair of front forks. Handle bars are installed on an upper surface of the upper bracket, and a handle holder extends from a center of an upper surface of the upper bracket toward the pair of front forks. In a state in which a base portion is formed on each handle bar, and the base portion and the handle holder are overlapped with each other, the base portion and handle holder are fixed to the upper bracket by a fixing member on an inner side of the pair of front forks in a vehicle width direction. Even if components are installed outside the pair of front forks in the vehicle width direction, the handle bars do not interfere with the components, and a degree of freedom in designing installation positions, installation directions, bar shapes, and the like of the handle bars is not restricted by the components. Therefore, the degree of freedom in designing the handle bars is improved.

Figure 1:
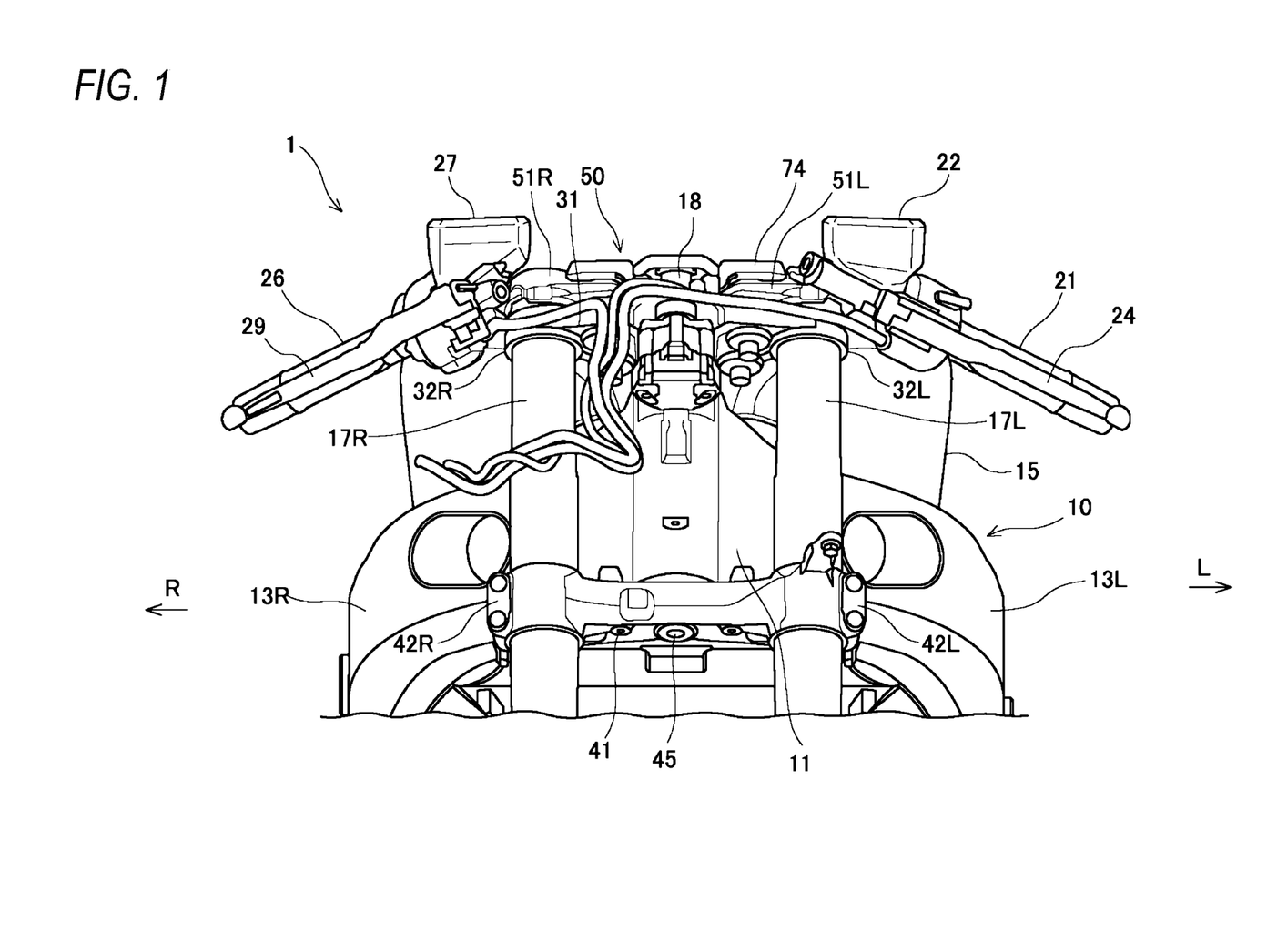
FIG. 1 is a front view of a front portion of a vehicle according to the present embodiment.
Figure 2:
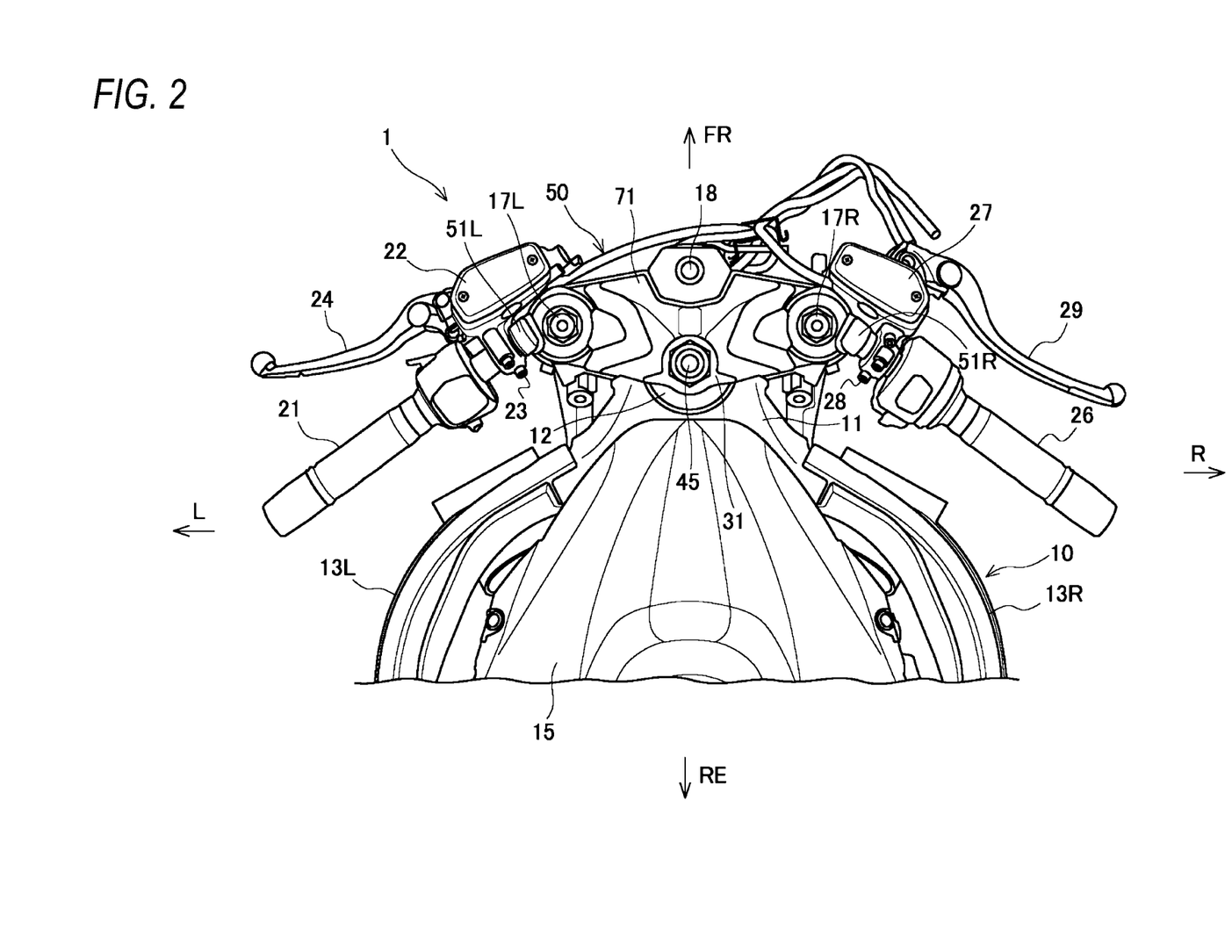
FIG. 2 is a top view of the front portion of the vehicle according to the present embodiment.
Figure 3:
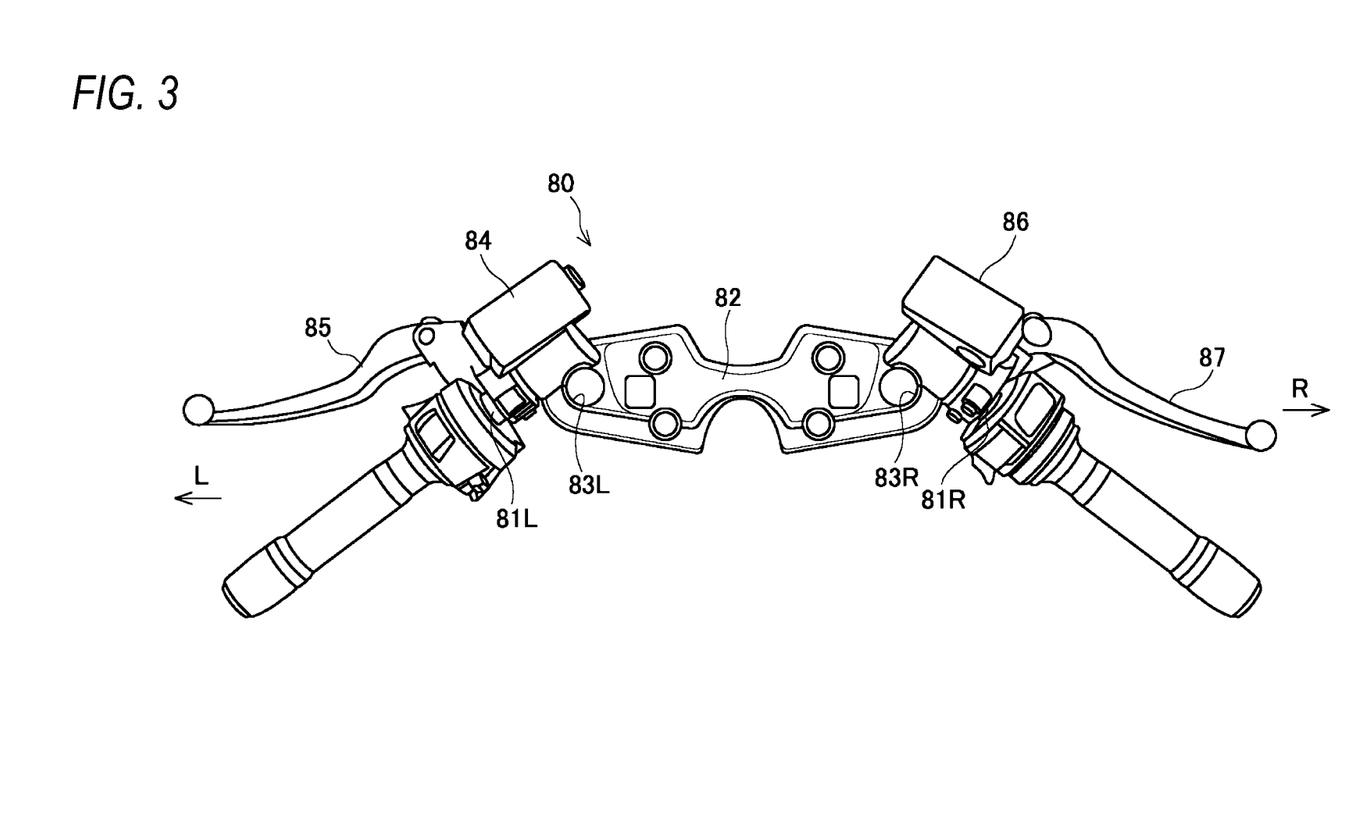
FIG. 3 is a top view of a handle according to a comparative example.

Hereinafter, the present embodiment will be described in detail with reference to the accompanying drawings. FIG. 1 is a front view of a front portion of a vehicle according to the present embodiment. FIG. 2 is a top view of the front portion of the vehicle according to the present embodiment. FIG. 3 is a top view of a handle according to a comparative example. In the following drawings, an arrow FR indicates a vehicle front side, an arrow RE indicates a vehicle rear side, an arrow L indicates a vehicle left side, and an arrow R indicates a vehicle right side.

As shown in FIGS. 1 and 2, a twin-spar type vehicle body frame 10 is provided in a straddle-type vehicle 1, and a pair of left and right main frames 13L, 13R extend rearward from a head frame 11 of a body frame 10. A steering shaft 45 is inserted into a head pipe 12 on a front side of the head frame 11, and a fuel tank 15 is installed on a rear side of the head frame 11. An upper bracket 31 is provided at an upper end portion of the steering shaft 45, and a lower bracket 41 is provided at a lower end portion of the steering shaft 45. A pair of left and right front forks 17L, 17R are held by the upper bracket 31 and the lower bracket 41.

A main switch 18 is provided on a central front side of the upper bracket 31. An upper end portion of the steering shaft 45 protruding upward from the head pipe 12 is fixed to a central rear side of the upper bracket 31. Upper clamps 32L, 32R holding upper end portions of the front forks 17L, 17R are formed on both left and right sides of the upper bracket 31, respectively. A lower end portion of the steering shaft 45 protruding downward from the head pipe 12 is fixed to a center of the lower bracket 41. Lower clamps 42L, 42R holding intermediate portions of the front forks 17L, 17R are formed on both left and right sides of the lower bracket 41, respectively.

In this way, the front forks 17L, 17R are integrated by the upper bracket 31 and the lower bracket 41, and the steering shaft 45 connecting the upper bracket 31 and the lower bracket 41 is supported by the head pipe 12. A handle 50 for swinging the front forks 17L, 17R to the left and right is installed on an upper surface of the upper bracket 31. The handle 50 includes a handle holder 71 covering the upper surface of the upper bracket 31, and a pair of left and right handle bars 51L, 51R of a separate type. The handle bars 51L, 51R are connected to each other via the handle holder 71.

A handle bar grip 21 is attached to the handle bar 51L on a left side, and a bar clamp 23 of a master cylinder 22 for a clutch is attached adjacent to a base end of the handle bar grip 21. A clutch lever 24 and a clutch cable are attached to the master cylinder 22. A throttle grip 26 is attached to the handle bar 51R on a right side, and a bar clamp 28 of a master cylinder 27 for braking is attached adjacent to a base end of the throttle grip 26. A brake lever 29 for a front brake and a brake cable are attached to the master cylinder 27.

In a handle 80 shown in the comparative example of FIG. 3, handle bars 81L, 81R are fixed to both left and right ends of a handle holder 82. Since adjustment holes 83L, 83R for adjusting front suspension are formed on both of the left and right sides of the handle holder 82, it is difficult to ensure an installation space of the handle bars 81L, 81R on both of the left and right ends of the handle holder 82. Further, a master cylinder 84 for a clutch, a clutch lever 85, and the like are installed in the vicinity of the adjustment hole 83L, and a master cylinder 86 for braking, a brake lever 87, and the like are installed in the vicinity of the adjustment hole 83R.

Therefore, in order to prevent the handle bars 81L, 81R from interfering with components such as the master cylinders 84, 86 and the levers 85, 87, a degree of freedom in designing installation positions, installation directions, bar shapes, and the like of the handle bars 81L, 81R is restricted by components in the vicinity of the handle. Therefore, in the handle 50 of the present embodiment, base end sides of the handle bars 51L, 51R extend inward in the vehicle width direction, and the handle bars 51L, 51R and the handle holder 71 are fixed to the upper bracket 31 by utilizing a space between the adjustment holes 56L, 56R (see FIG. 9) (see FIG. 8). Accordingly, the handle bars 51L, 51R do not interfere with components in the vicinity of the adjustment holes 56L, 56R, and a degree of freedom in designing the handle bars 51L, 51R is improved.

Figure 4:
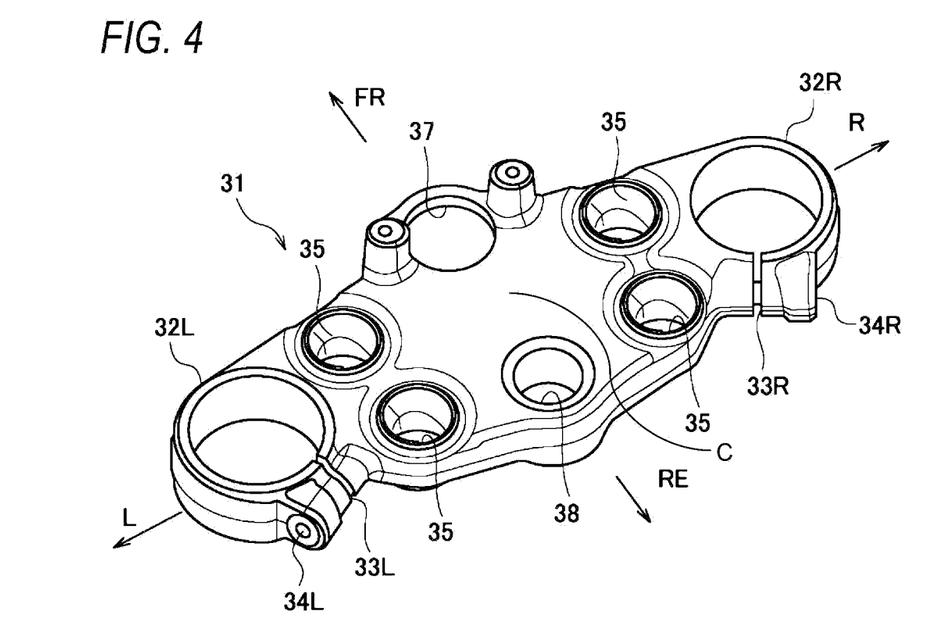
FIG. 4 is a perspective view of an upper bracket according to the present embodiment.
Figure 5:
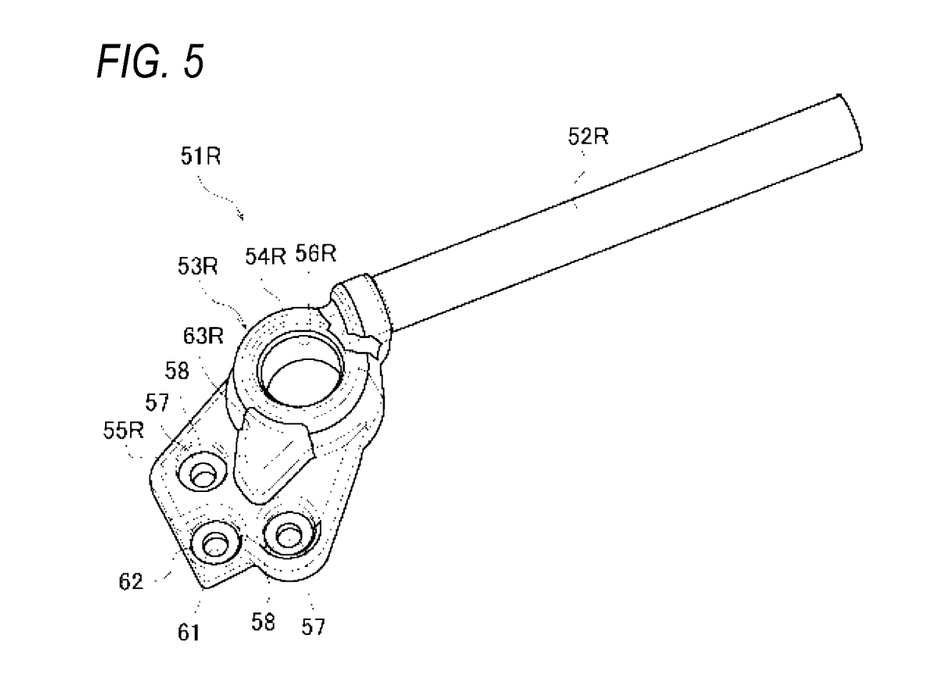
FIG. 5 is a perspective view of a handle bar according to the present embodiment.
Figure 6:
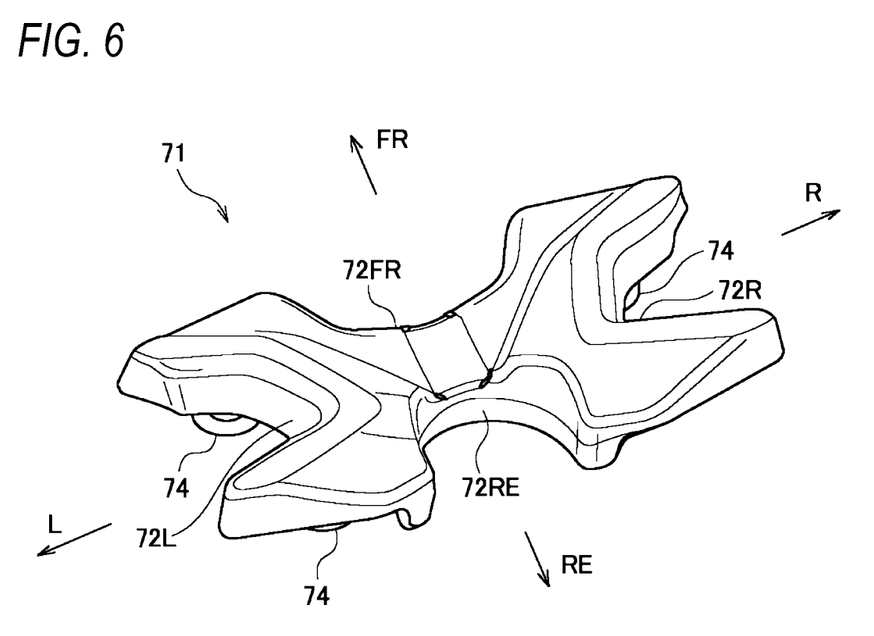
FIG. 6 is a perspective view of a handle holder according to the present embodiment.
Figure 7:
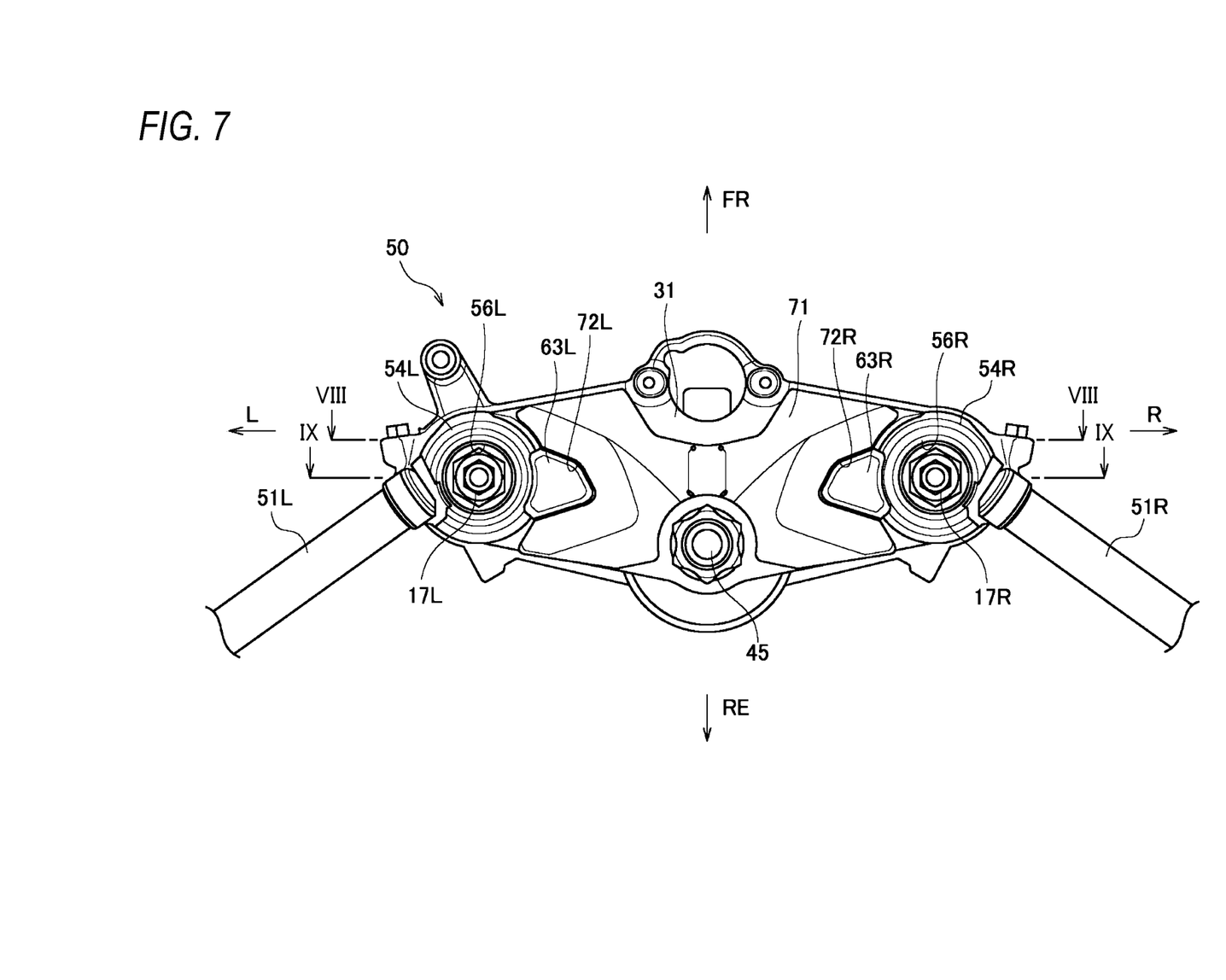
FIG. 7 is a top view of the handle according to the present embodiment.
Figure 8:
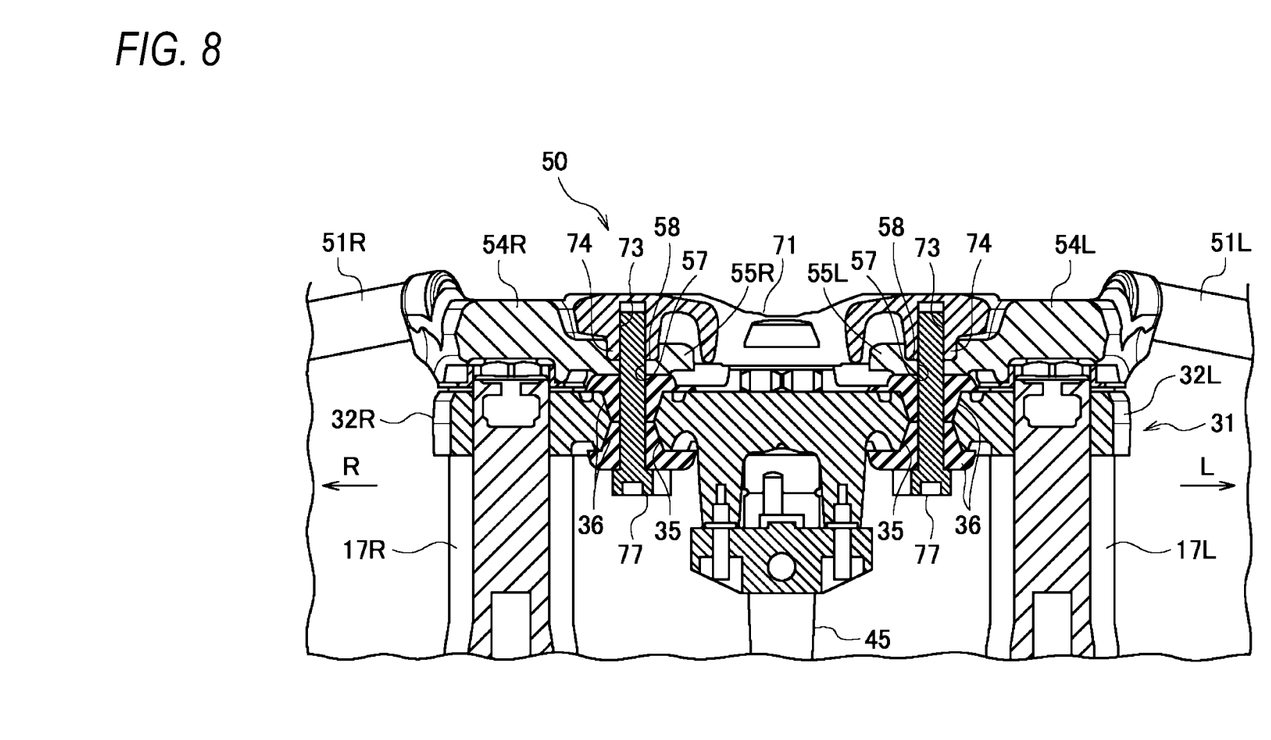
FIG. 8 is a cross-sectional view of the handle taken along a line VIII-VIII of FIG. 7.
Figure 9:
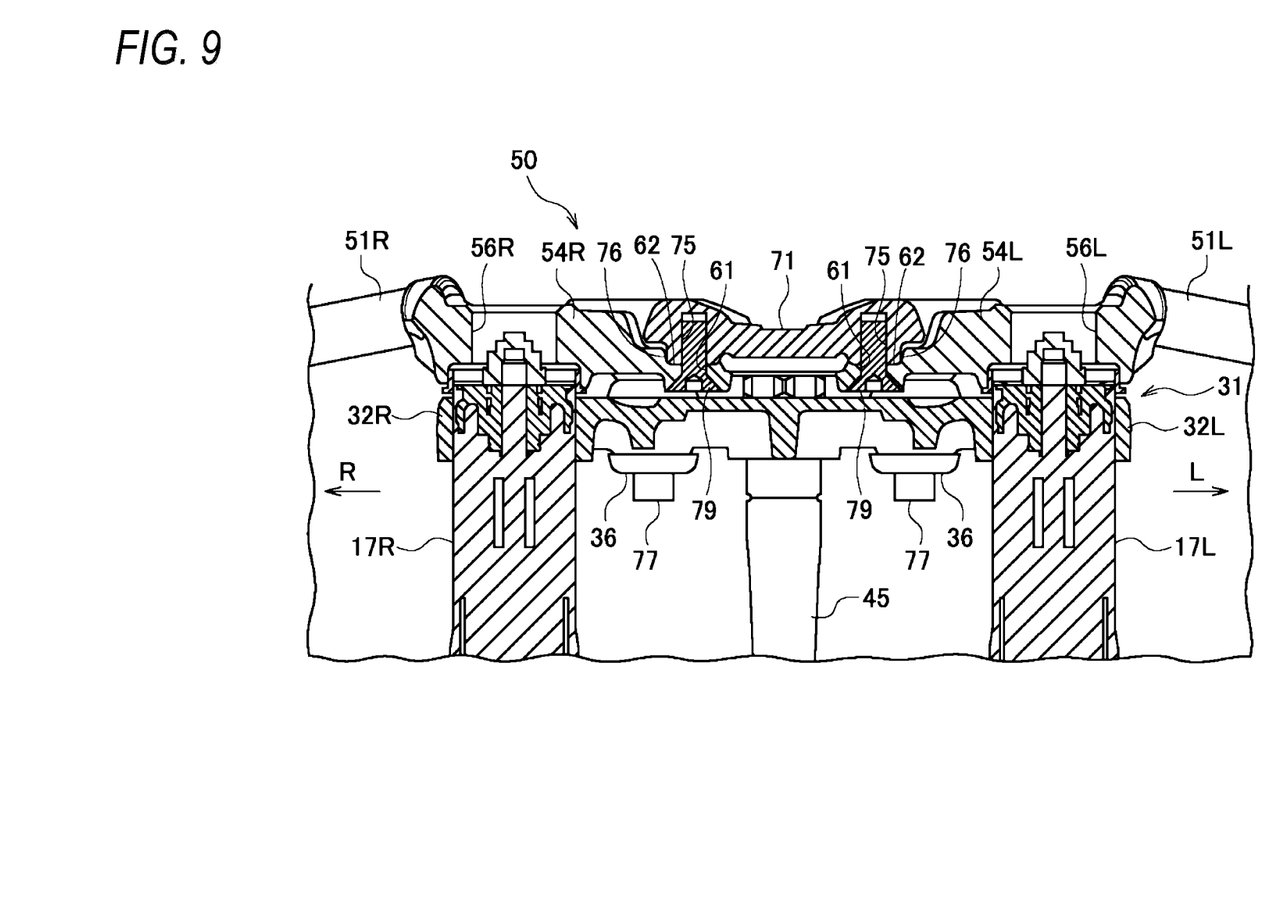
FIG. 9 is a cross-sectional view of the handle taken along a line IX-IX of FIG. 7.

Hereinafter, a detailed configuration of the handle will be described with reference to FIGS. 4 to 9. FIG. 4 is a perspective view of the upper bracket according to the present embodiment. FIG. 5 is a perspective view of the handle bar according to the present embodiment. FIG. 6 is a perspective view of the handle holder according to the present embodiment. FIG. 7 is a top view of the handle according to the present embodiment. FIG. 8 is a cross-sectional view of the handle taken along a line VIII-VIII of FIG. 7. FIG. 9 is a cross-sectional view of the handle taken along a line IX-IX of FIG. 7.

As shown in FIG. 4, the tubular upper clamps 32L, 32R fixing the pair of front forks 17L, 17R (see FIG. 1) are formed on both of the left and right sides of the upper bracket 31, respectively. Slits 33L, 33R are formed on side walls of the upper clamps 32L, 32R in an upper-lower direction, and adjustment bolts 34L, 34R are provided on the side walls respectively so as to be orthogonal to the slits 33L, 33R. Since an interval between the slits 33L, 33R is narrowed by tightening the adjustment bolts 34L, 34R, the front forks 17L, 17R inserted into clamp holes of the upper clamps 32L, 32R are fixed.

Four through holes 35 for fixing the handle bars 51L, 51R and the handle holder 71 are formed adjacent to the upper clamps 32L, 32R. An inner peripheral surface of each of the through holes 35 is inclined such that an intermediate position thereof in a penetrating direction is a minimum hole diameter, and tubular rubber bushes 36 (see FIG. 8) are mounted as vibration absorbing members on the respective through holes 35. An attachment hole 37 for attaching the main switch 18 (see FIG. 1) is formed on the front side of the center of the upper bracket 31, and a shaft hole 38 for fixing the steering shaft 45 (see FIG. 1) is formed on the rear side of the center of the upper bracket 31.

As shown in FIG. 5, the handle bar 51R includes a bar main body 52R on which a grip is mounted, and a base portion 53R installed on the upper surface of the upper bracket 31. The base portion 53R includes a tubular portion 54R connected to a base end of the bar main body 52R, and a plate-shaped portion 55R extending inward in the vehicle width direction from the tubular portion 54R. The tubular portion 54R protrudes upward from the plate-shaped portion 55R, and the adjustment hole 56R for exposing the front fork 17R is formed inside the tubular portion 54R. A pair of through holes 57 connected to the through holes 35 of the upper bracket 31 are formed on front and rear sides of the plate-shaped portion 55R. A concave portion 58 for positioning the handle holder 71 is formed around each through hole 57.

A through hole 61 for fixing the handle holder 71 is formed on an inner side (left side in the drawing) of the plate-shaped portion 55R in the vehicle width direction. A concave portion 62 for positioning the handle holder 71 is formed around the through hole 61. A raised portion 63R raised along a notch 72R (see FIG. 6) of an outer edge of the handle holder 71, which will be described later, is formed on an upper surface of the plate-shaped portion 55R. The raised portion 63R extends from the tubular portion 54R toward a portion between the pair of through holes 57. The handle bar 51R on the right side has been described in FIG. 5, and the handle bar 51L on the left side has a similar configuration as the handle bar 51R on the right side.

As shown in FIG. 6, the outer edges on front and the rear sides of the handle holder 71 are each cut out in an arch shape, and the outer edges on left and right sides of the handle holder 71 are cut out symmetrically, so that the handle holder 71 is formed in an X shape in a top view. A notch 72FR on the front side of the handle holder 71 is formed so as to avoid the main switch 18 (see FIG. 2), and a notch 72RE on the rear side of the handle holder 71 is formed so as to avoid the steering shaft 45 (see FIG. 2). Both left and right notches 72L, 72R of the handle holder 71 are formed so as to avoid raised portions 63L, 63R (see FIG. 2) of the handle bars 51L, 51R.

The handle holder 71 extends from the center C of the upper surface of the upper bracket 31 toward the pair of front forks 17L, 17R in the X shape in the top view. Bottomed screw holes (fixing hole) 73 connected to the through holes 57 of the handle bars 51L, 51R are formed on a lower surface of an extended portion of the handle holder 71 (see FIG. 8). Convex portions 74 for positioning the handle bars 51L, 51R are formed around the screw holes 73, respectively. Bottomed screw holes 75 connected to the through holes 61 of the handle bars 51L, 51R are formed on a lower surface of a central portion of the handle holder 71 (see FIG. 9). Convex portions 76 (see FIG. 9) for positioning the handle bars 51L, 51R are formed around the screw holes 75, respectively.

As shown in FIGS. 7 to 9, the handle bars 51L, 51R and the handle holder 71 are fixed to the upper bracket 31. In the top view, the raised portions 63L, 63R of the handle bars 51L, 51R are inserted into the notches 72L, 72R of the handle holder 71 (in particular, see FIG. 7). In the cross-sectional view, the convex portions 74 of the handle holder 71 enter the concave portions 58 of the handle bars 51L, 51R (in particular, see FIG. 8), and the convex portions 76 of the handle holder 71 enter the concave portions 62 of the handle bars 51L, 51R (in particular, see FIG. 9). In this way, the handle bars 51L, 51R and the handle holder 71 are positioned.

As described above, upper portions of the front forks 17L, 17R are fixed to the upper clamps 32L, 32R of the upper bracket 31, respectively. The tubular portions 54L, 54R of the handle bars 51L, 51R are positioned above the upper clamps 32L, 32R, and the front forks 17L, 17R are exposed upward from the adjustment holes 56L, 56R of the tubular portions 54L, 54R, respectively. In the cross-sectional view, the adjustment holes 56L, 56R are formed in a stepped shape in the tubular portions 54L, 54R (in particular, see FIG. 9), and lower-stepped sides of the adjustment holes 56L, 56R are enlarged in diameter so as to allow upper end portions of outer tubes or inner tubes of the front forks 17L, 17R to enter.

The pair of upper and lower rubber bushes 36 are mounted on the through hole 35 of the upper bracket 31. The rubber bush 36 is of a tubular type with a flange, and the tubular portion is formed in a truncated cone shape in the cross-sectional view. The rubber bush 36 is inserted into the through hole 35 of the upper bracket 31 from an upper side, the rubber bush 36 is inserted into the through hole 35 of the upper bracket 31 from a lower side, and front ends of the tubular portions of the pair of upper and lower rubber bushes 36 are attached to each other. The flange of the rubber bush 36 on the upper side is a support surface of each of the handle bars 51L, 51R, and the flange of the rubber bush 36 on the lower side is a seat surface of a bolt 77.

The screw hole 73 of the handle holder 71 communicates with an opening of the rubber bush 36 through the through hole 57 of each of the handle bar 51L, 51R (see FIG. 8). The bolt (fixing member) 77 is inserted into the rubber bush 36 from a lower surface side of the upper bracket 31, and the bolt 77 penetrating the upper bracket 31 is fixed to the screw hole 73 of the handle holder 71 through the through hole 57 of each of the handle bars 51L, 51R. Since the convex portion 74 is formed around the screw hole 73 of the handle holder 71, the screw hole 73 can be formed long in the upper-lower direction by the convex portion 74. In this way, the handle holder 71 and the handle bars 51L, 51R are screwed to the upper bracket 31.

The screw holes 75 of the handle holder 71 communicate with the through holes 61 of the handle bars 51L, 51R (see FIG. 9). Bolts 79 are inserted into the through holes 61 of the handle bars 51L, 51R from lower surface sides of the plate-shaped portions 55L, 55R, respectively, and the bolts 79 are fixed to the screw holes 75 of the handle holder 71 through the through holes 61 of the handle bars 51L, 51R, respectively. Accordingly, the plate-shaped portions 55L, 55R of the handle bars 51L, 51R are connected to each other via the handle holder 71. Although the handle bars 51L, 51R are of a separate type, a sense of unity between the handle bars 51L, 51R can be obtained, and an overall rigidity when the handle is turned to the left and right is increased, thereby improving operability.

Since the screw holes 73, 75 of the handle holder 71 are bottomed holes each having an open lower surface, the bolts 77, 79 are not exposed on an upper surface of the handle holder 71. The bolts 77, 79 become inconspicuous, and an appearance in the vicinity of the handle is improved. Further, water, dust, and the like hardly enter the screw holes 73, 75, and the occurrence of rust and scratches on the bolts 77, 79 is prevented. The handle bars 51L, 51R are floatingly supported by the upper bracket 31 via the rubber bushes 36. Since the rubber bushes 36 are interposed between the upper bracket 31 and the handle bars 51L, 51R, vibration transmitted from the upper bracket 31 to the handle bars 51L, 51R is reduced.

Further, the plate-shaped portions 55L, 55R of the handle bars 51L, 51R are formed to be lower than the tubular portion 54L, 54R, and the handle holder 71 is installed on upper surfaces of the plate-shaped portions 55L, 55R. A thickness of the handle holder 71 is formed to be substantially the same as an amount of protrusion of the tubular portions 54L, 54R from the upper surfaces of the plate-shaped portions 55L, 55R. Therefore, even when the handle holder 71 is overlapped with the plate-shaped portions 55L, 55R, the handle holder 71 does not significantly protrude from the tubular portions 54L, 54R. Since the upper surface of the handle holder 71 is suppressed to be low and the handle 50 is formed in a compact manner, a meter and the like installed around the handle can be easily seen.

Figure 10:
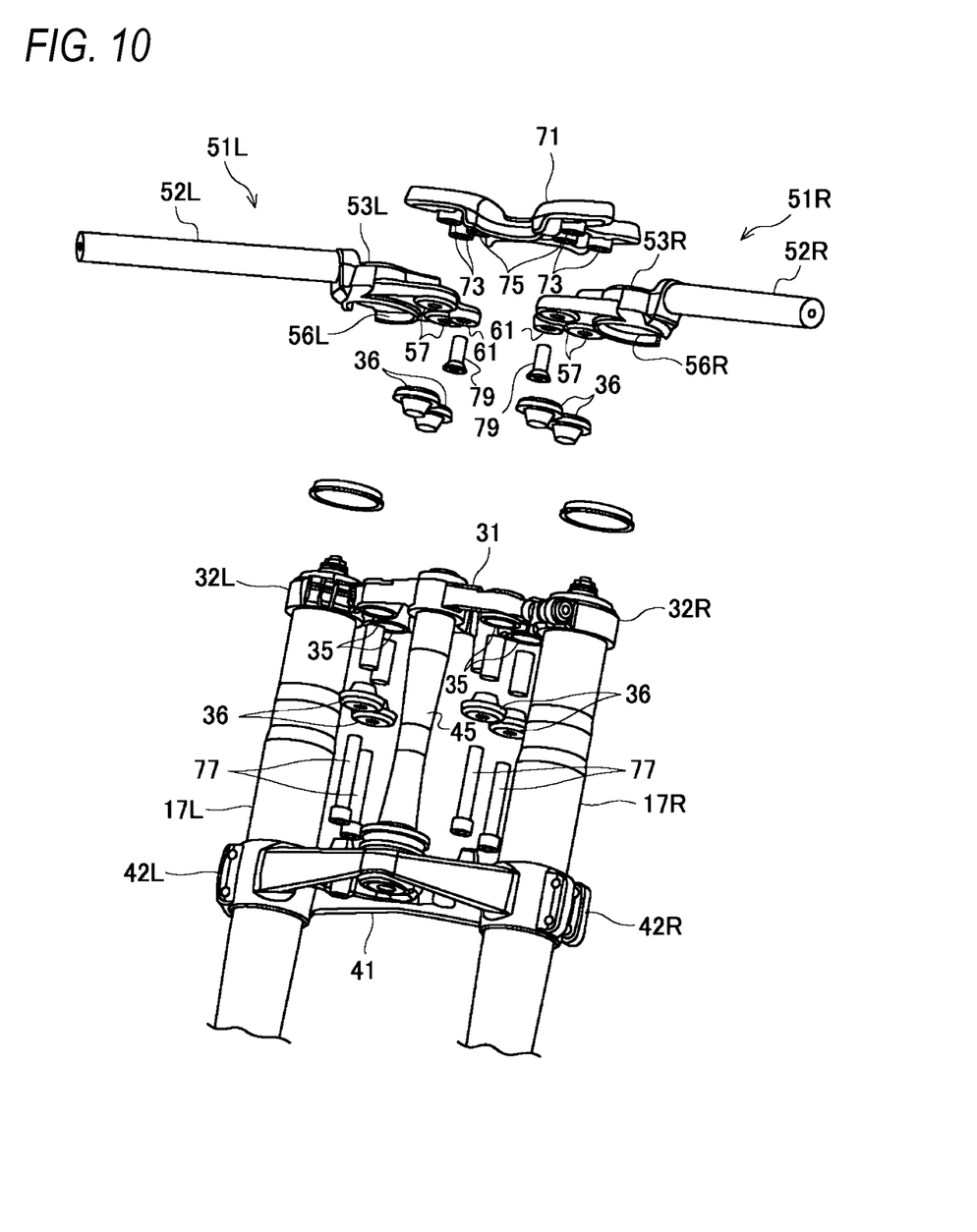
FIG. 10 is an exploded perspective view of an assembly structure of the handle according to the present embodiment.

An assembling work of the handle to the upper bracket will be described with reference to FIG. 10. FIG. 10 is an exploded perspective view of an assembly structure of the handle according to the present embodiment.

As shown in FIG. 10, first, the handle 50 is assembled by the handle bars 51L, 51R and the handle holder 71. At this time, the handle bars 51L, 51R and the handle holder 71 are aligned with the raised portions 63L, 63R of the handle bars 51L, 51R and the notches 72L, 72R of the handle holder 71 as guides. The convex portions 74, 76 (see FIGS. 8 and 9) of the handle holder 71 enter the concave portions 58, 62 (see FIGS. 8 and 9) of the handle bars 51L, 51R, and the handle holder 71 and the handle bars 51L, 51R are positioned. The bolts 79 are inserted into the through holes 61 of the handle bars 51L, 51R from below and fixed to the screw holes 75 of the handle holder 71.

Next, the handle bars 51L, 51R integrated via the handle holder 71 are fixed to the upper bracket 31. At this time, the rubber bushes 36 are mounted on each of the through holes 35 of the upper bracket 31 from both of the upper and lower sides. Further, the adjustment holes 56L, 56R of the handle bars 51L, 51R are aligned with the upper ends of the front forks 17L, 17R, and the through holes 57 of the handle bars 51L, 51R are aligned with the openings of the rubber bushes 36. The bolt 77 is inserted into the opening of the rubber bush 36 from below and fixed to the screw hole 73 of the handle holder 71 through the through hole 57 of each of the handle bars 51L, 51R.

In this way, the handle bars 51L, 51R and the handle holder 71 are assembled to the upper bracket 31 in a state in which the separate type handle bars 51L, 51R are integrated via the handle holder 71. Assembling performance is improved without requiring a fine adjustment after assembly of the handle bars 51L, 51R or a special structure for positioning of the handle bars 51L, 51R. As described above, since the bolts 77, 79 are not exposed from the handle holder 71, the appearance in the vicinity of the handle is improved, and cover components for protecting the bolts are not required, which simplifies a component configuration. Further, a tightening work is facilitated by using pressing bolts that do not require nuts for fixation, but not the through bolts that require nuts.

As described above, according to the present embodiment, the base portions 53L, 53R of the handle bars 51L, 51R and the handle holder 71 are overlapped with each other on an inner side of the pair of front forks 17L, 17R in the vehicle width direction, and the base portions 53L, 53R and the handle holder 71 are fixed to the upper bracket 31. Even if components are installed outside the pair of front forks 17L, 17R in the vehicle width direction, the handle bars 51L, 51R do not interfere with the components, and a degree of freedom in designing installation positions, installation directions, bar shapes, and the like of the handle bars 51L, 51R is not restricted by the components. Therefore, the degree of freedom in designing the handle bars 51L, 51R is improved.

In the present embodiment, the pair of handle bars are connected to the handle holder, but the pair of handle bars may not be connected to the handle holder. For example, the handle holder may function as a cover member that extends from the center C of the upper surface of the upper bracket 31 toward the pair of front forks and covers the upper surface of the upper bracket. In this case, the pair of handle bars may be directly fixed to the upper bracket.

Further, in the present embodiment, the through holes are formed in the handle bars, the screw holes are formed in the handle holder, and the handle bars and the handle holder are fixed to the upper bracket by the pressing bolts, but an assembly configuration is not limited to this configuration. The through holes may be formed in the handle bars and the handle holder, and the handle bars and the handle holder may be fixed to the upper bracket by the through bolts and the nuts.

Further, in the present embodiment, the screw hole of the handle holder is formed by the bottomed hole, but the screw hole of the handle holder may be formed by the through hole.

Further, in the present embodiment, the convex portion is formed around the screw hole of the handle holder, and the concave portion is formed around the through hole of the handle bar, but the convex portion and the concave portion are not limited to this configuration. Of mating surfaces around the screw hole of the handle holder and around the through holes of the base portions, the convex portion only needs to be formed on one of the mating surfaces, and the concave portion that the convex portion enters only needs to be formed on the other mating surface. Therefore, the concave portion may be formed around the screw hole of the handle holder, and the convex portion that enters the concave portion may be formed around the through hole of the handle bar.

Further, in the present embodiment, the handle bar is supported by the upper bracket as the vibration absorbing member via the rubber bush, but the vibration absorbing member is not limited to the rubber bush. The vibration absorbing member may be formed of a material capable of absorbing the vibration transmitted from the upper bracket to the handle bar, and may be formed of, for example, an elastic body such as a spring or a foam such as a sponge.

Further, in the present embodiment, the base portions and the handle holder are fixed to the upper bracket by the fixing members on an inner side of the pair of adjustment holes in the vehicle width direction, but fixing positions by the fixing members are not limited to this configuration. The base portions and the handle holder only need to be fixed to the upper bracket by the fixing members on an inner side of centers of the pair of adjustment holes in the vehicle width direction.

Further, the handle according to the present embodiment can be appropriately applied to other straddle-type vehicles such as a buggy type automatic three-wheeled vehicle. Here, the straddle-type vehicle is not limited to general vehicles where a rider sits in a posture of straddling a seat, and also includes a scooter-type vehicle where a rider sits without straddling a seat.

As described above, a handle (50) of the present embodiment is a handle installed on an upper bracket (31) connecting upper end sides of a pair of front forks (17L, 17R), the handle including: handle bars (51L, 51R) including base portions (53L, 53R) installed on an upper surface of the upper bracket; and a handle holder (71) extending from a center (C) of the upper surface of the upper bracket 31 toward the pair of front forks, in which the base portions and the handle holder are fixed to the upper bracket by fixing members (bolts 77). According to this configuration, the base portions and the handle holder of the handle bar are overlapped with each other on an inner side of the pair of front forks in a vehicle width direction, and the base portions and the handle holder are fixed to the upper bracket. Even if components are installed outside the pair of front forks in the vehicle width direction, the handle bars do not interfere with the components, and a degree of freedom in designing installation positions, installation directions, bar shapes, and the like of the handle bars is not restricted by the components. Therefore, the degree of freedom in designing the handle bars is improved.

In the handle according to the present embodiment, fixing holes (screw holes 73) are formed in the handle holder, through holes (57) are formed in the base portions, and the fixing members penetrating the upper bracket from a lower surface side are fixed to the fixing holes through the through holes. According to this configuration, since the handle bars and the handle holder are fixed by the fixing members from the lower surface side of the upper bracket, the fixing members become inconspicuous, and an appearance in the vicinity of the handle is improved.

In the handle according to the present embodiment, the fixing holes are bottomed holes. According to this configuration, since the fixing members are not exposed from the handle holder in a top view, water, dust, and the like hardly enter the fixing holes.

In the handle according to the present embodiment, convex portions (74) only need to be formed on one of a mating surfaces around the fixing holes of the handle holder and a mating surface around the through holes of the base portions, and concave portions (58) that the convex portions enter only need to be formed on the other of the mating surfaces. According to this configuration, the handle holder and the handle bars are positioned, and assembling performance is improved.

In the handle according to the present embodiment, the handle bars are a separate type including a pair of handle bars, and the handle holder connects base portions of the pair of handle bars to each other. According to this configuration, while the handle bar of the separate type is provided, a sense of unity between the pair of handle bars is obtained, thereby improving operability.

In the handle according to the present embodiment, notches (72L, 72R) are formed on an outer edge of the handle holder, and raised portions (63L, 63R) along the notches are formed on upper surfaces of the base portions. According to this configuration, the handle holder is aligned with the base portions by using the notches of the handle holder and the raised portions of the base portions as guides, and the assembling performance is improved.

In the handle according to the present embodiment, the pair of handle bars are supported by the upper bracket via vibration absorbing members (rubber bushes 36). According to this configuration, vibration transmitted from the upper bracket to the handle bars can be reduced by the vibration absorbing members.

In the handle according to the present embodiment, adjustment holes (56L, 56R) for exposing the front forks are formed in the base portions, and the base portions and the handle holder are fixed to the upper bracket by the fixing members on the inner side with respect to the centers of the adjustment holes in the vehicle width direction. According to this configuration, the handle bars can be installed to the upper bracket without restricting the degree of freedom in designing the handle bars by utilizing a space on the inner side in the vehicle width direction of the adjustment holes of the front forks.

Although the present embodiment has been described, the above-described embodiment and the modification may be combined in whole or in part as another embodiment.

The technique of the present invention is not limited to the above-described embodiment, and various changes, substitutions, and modifications may be made without departing from the spirit of the technical idea of the present invention. Further, the present invention may be implemented using other methods as long as the technical concepts can be implemented by the methods through advance of the technology or other derived technologies. Accordingly, the claims cover all embodiments that may be included within the scope of the technical concepts.

What is claimed is:

1. A handle for a saddle-ride vehicle, to be installed on an upper bracket that connects upper end sides of a pair of front forks of the saddle-ride vehicle, the handle comprising:
    a handle bar including a base portion installed on an upper surface of the upper bracket facing upward in an upper-lower direction of the saddle-ride vehicle; and
    a handle holder extending from a center of the upper surface of the upper bracket toward the pair of front forks, wherein
    the base portion and the handle holder are fixed to the upper bracket by a bolt,
    a fixing hole is formed in the handle holder,
    a through hole is formed in the base portion,
    the bolt penetrating the upper bracket from a side of a lower surface thereof facing downward in the upper-lower direction is fixed to the fixing hole through the through hole, and
    a convex portion is formed on one of a mating surface around the fixing hole of the handle holder and a mating surface around the through hole of the base portion, and a concave portion that the convex portion enters is formed on the other of the mating surfaces.

2. The handle according to claim 1, wherein the fixing hole is a bottomed hole.

3. The handle according to claim 1, wherein the handle bar includes a pair of handle bars separated from each other, and the handle holder connects base portions of the pair of handle bars to each other.

4. The handle according to claim 3, wherein a notch is formed on an outer edge of the handle holder, and a raised portion along the notch is formed on an upper surface of the base portion.

5. The handle according to claim 3, wherein the pair of handle bars are supported by the upper bracket via a vibration absorbing member.

6. The handle according to claim 1, wherein an adjustment hole for exposing the front forks is formed in the base portion, and the base portion and the handle holder are fixed to the upper bracket by the bolt on an inner side with respect to a center of the adjustment hole in a vehicle width direction.

7. A handle for a saddle-ride vehicle, to be installed on an upper bracket that connects upper end sides of a pair of front forks of the saddle-ride vehicle, the handle comprising:
    a handle bar including a base portion installed on an upper surface of the upper bracket facing upward in an upper-lower direction of the saddle-ride vehicle; and
    a handle holder extending from a center of the upper surface of the upper bracket toward the pair of front forks, wherein
    the base portion and the handle holder are fixed to the upper bracket by a bolt,
    the handle bar includes a pair of handle bars separated from each other,
    the handle holder connects base portions of the pair of handle bars to each other
    a notch is formed on an outer edge of the handle holder, and
    a raised portion along the notch is formed on an upper surface of the base portion.

8. A handle for a saddle-ride vehicle, to be installed on an upper bracket that connects upper end sides of a pair of front forks of the saddle-ride vehicle, the handle comprising:
    a handle bar including a base portion installed on an upper surface of the upper bracket facing upward in an upper-lower direction of the saddle-ride vehicle; and
    a handle holder extending from a center of the upper surface of the upper bracket toward the pair of front forks, wherein
    the base portion and the handle holder are fixed to the upper bracket by a bolt,
    an adjustment hole for exposing the front forks is formed in the base portion, and
    the base portion and the handle holder are fixed to the upper bracket by the bolt on an inner side with respect to a center of the adjustment hole in a vehicle width direction.

* * * * *